(12) United States Patent
Bowden

(10) Patent No.: US 11,584,062 B2
(45) Date of Patent: Feb. 21, 2023

(54) METHOD AND SYSTEMS FOR APPLYING STRETCH FILMS/PLASTIC FILMS AT A CONTROLLED TEMPERATURE

(71) Applicant: RLMB Group, LLC, Honolulu, HI (US)

(72) Inventor: R. Craig Bowden, Honolulu, HI (US)

(73) Assignee: RLMB Group, LLC, Honolulu, HI (US)

( * ) Notice: Subject to any disclaimer, the term of this patent is extended or adjusted under 35 U.S.C. 154(b) by 0 days.

(21) Appl. No.: 17/384,281

(22) Filed: Jul. 23, 2021

(65) Prior Publication Data

US 2021/0347104 A1 Nov. 11, 2021

Related U.S. Application Data

(62) Division of application No. 15/815,208, filed on Nov. 16, 2017, now Pat. No. 11,110,645.

(51) Int. Cl.
*B29C 55/06* (2006.01)
*B29C 51/46* (2006.01)
(Continued)

(52) U.S. Cl.
CPC .......... *B29C 55/065* (2013.01); *B29B 13/023* (2013.01); *B29C 51/46* (2013.01); *B29C 55/18* (2013.01); *B29D 7/01* (2013.01); *B29C 35/02* (2013.01); *B29C 35/0255* (2013.01); *B29C 35/12* (2013.01); *B29C 2035/0283* (2013.01);
(Continued)

(58) Field of Classification Search
None
See application file for complete search history.

(56) References Cited

U.S. PATENT DOCUMENTS

| 2,278,472 A | 4/1942 | Musher |
| 4,643,943 A | 2/1987 | Schoenberg |

(Continued)

FOREIGN PATENT DOCUMENTS

| CN | 207639628 U | 7/2018 |
| EP | 0274163 A2 | 7/1988 |

(Continued)

OTHER PUBLICATIONS

International Search Report and Written Opinion issued in International Patent Application No. PCT/US2018/061581 dated Mar. 14, 2019 [Cited in parent].

(Continued)

*Primary Examiner* — Robert J Grun
(74) *Attorney, Agent, or Firm* — Michele V. Frank; Venable LLP

(57) ABSTRACT

A system for controlling the temperature of a film before and/or during application, the system including: a heat source for heating a film; and stretch rollers; wherein the heat source heats the film from an ambient temperature to a temperature from about 2° C. to about 40° C. above the ambient temperature, wherein the film is heated prior to or simultaneous to being stretched by the stretch rollers, and wherein the ambient temperature is below 15° C. The preheating system may be used to enhance binding and sealing properties of stretch films used for wrapping palletized products in a reduced temperature environment. Other embodiments of the preheating film system, and methods for its use, are described herein.

8 Claims, 4 Drawing Sheets

(51) Int. Cl.
  *B29C 55/18* (2006.01)
  *B29D 7/01* (2006.01)
  *B29B 13/02* (2006.01)
  B29C 35/02 (2006.01)
  B29K 105/00 (2006.01)
  B29C 35/08 (2006.01)
  B29C 35/04 (2006.01)
  B29C 35/12 (2006.01)

(52) U.S. Cl.
  CPC ............ *B29C 2035/046* (2013.01); *B29C 2035/0822* (2013.01); *B29C 2035/0855* (2013.01); *B29C 2035/0861* (2013.01); *B29C 2948/92704* (2019.02); *B29K 2105/256* (2013.01)

(56) References Cited

U.S. PATENT DOCUMENTS

| | | | |
|---|---|---|---|
| 4,818,549 A | 4/1989 | Steiner et al. |
| 4,886,372 A | 12/1989 | Greengrass et al. |
| 5,964,182 A | 10/1999 | Cox et al. |
| 6,099,892 A | 8/2000 | Masden et al. |
| 6,265,006 B1 | 7/2001 | Inglis et al. |
| 6,481,185 B1 | 11/2002 | Buchko |
| 6,517,936 B1 | 2/2003 | Ciocca et al. |
| 7,247,330 B2 | 7/2007 | Kuethe et al. |
| 8,083,085 B2 | 12/2011 | Sambrailo et al. |
| 2005/0040068 A1 | 2/2005 | Palder |
| 2006/0147588 A1 | 7/2006 | Garwood |
| 2006/0198798 A1 | 9/2006 | Tichy et al. |
| 2007/0020364 A1 | 1/2007 | Burnett et al. |
| 2007/0059410 A1 | 3/2007 | Steffen |
| 2007/0104836 A1 | 5/2007 | Zhao et al. |
| 2010/0181318 A1 | 7/2010 | Bava et al. |
| 2012/0121679 A1 | 5/2012 | Cannon et al. |
| 2014/0322407 A1 | 10/2014 | Man et al. |
| 2015/0306269 A1 | 10/2015 | Bullard et al. |
| 2016/0262410 A1 | 9/2016 | Hoefnagels |
| 2017/0013849 A1 | 1/2017 | Thippareddi et al. |
| 2018/0360077 A1 | 12/2018 | Krebs et al. |

FOREIGN PATENT DOCUMENTS

| | | |
|---|---|---|
| EP | 1331168 A1 | 7/2003 |
| EP | 2478780 A1 | 7/2012 |
| ES | 2393388 B1 | 11/2013 |
| JP | 2010235169 A | 10/2010 |
| JP | 5470975 B2 | 4/2014 |
| WO | 199204256 A2 | 3/1992 |
| WO | 199944444 A1 | 9/1999 |
| WO | 2010064773 A1 | 6/2010 |
| WO | 2015189351 A1 | 12/2015 |
| WO | 2016044766 A1 | 3/2016 |
| WO | 2016095024 A1 | 6/2016 |

OTHER PUBLICATIONS

Air Products, Modified atmospheric packaging (MAP) Air Products' Freshline Solutions Help Make the Application Achievable, Productive and Seamless for the End User, Air Products and Chemicals Inc., 2007 [Cited in parent].

Extended European Search Report dated Jul. 15, 2021, directed to EP Application No. 18879328.5; 6 pages [Cited in parent].

Notice of Allowance dated Dec. 28, 2020, directed to U.S. Appl. No. 16/192,761; 9 pages [Available in IFW].

Non-Final Office Action dated Jun. 11, 2021, directed to U.S. Appl. No. 15/815,208; 11 pages [Available in IFW].

Final Office Action dated Nov. 20, 2020, directed to U.S. Appl. No. 15/815,208; 14 pages [Available in IFW].

Advisory Action dated Jan. 27, 2021, directed to U.S. Appl. No. 15/815,208; 5 pages [Available in IFW].

Notice of Allowance dated Apr. 2, 2021, directed to U.S. Appl. No. 15/815,208; 8 pages [Available in IFW].

Notice of Allowance dated Aug. 10, 2021, directed to U.S. Appl. No. 15/815,208; 3 pages [Available in IFW].

METHOD AND SYSTEMS FOR APPLYING STRETCH FILMS/PLASTIC FILMS AT A CONTROLLED TEMPERATURE

CROSS-REFERENCE TO RELATED APPLICATION

This application is a divisional of U.S. Nonprovisional patent application Ser. No. 15/815,208, filed Nov. 16, 2017. The contents of the foregoing application is incorporated herein by reference in its entirety.

TECHNICAL FIELD

The present invention generally relates to a method and systems for applying stretch films at a controlled temperature to improve performance and quality, including the preheating of films for forming an improved sealed enclosure for palletized products and packaged goods. More specifically, embodiments of the invention relate to preheating stretch films above ambient temperature to enhance film-to-film binding and sealing properties of various types of stretch films used to wrap and bag pallets in reduced temperature environments.

BACKGROUND

Perishable products or other environmentally sensitive goods risk damage from numerous sources during transportation. Sources of damage may include wind, dirt, moisture, temperature changes, insects, excessive pressure, and excessive movement. Various forms of packaging have been used to minimize damage or decay of such goods. For example, goods may be secured to a pallet to facilitate the transport of such goods and to protect the goods from damage caused by shifting during transport. To further protect the products from damage, palletized goods may be further enclosed or encased with a protective barrier or film. For example, techniques for creating an enclosure include heat shrinking plastic ("shrink wrap") around the goods which have been placed on a pallet, or placing a plastic bag around the goods on a pallet. By forming such an enclosure, the goods can be protected from environmental factors such as moisture or other external contaminants.

Perishable products or other environmentally sensitive goods may include, for example, produce, plants, fresh or frozen foods, prepared foods, agricultural products, meats, cell cultures, tissues, organisms, electrical components, and raw materials. In order to prevent decay or spoilage, the perishable products generally must be maintained in an optimal environment specific to the type of product. The environment may control for temperature, humidity, pressure, and air or gas composition. In addition to being stored and transported in the controlled environment, the perishable products must be packed and prepared for storage and transport in the same environment.

To maintain the environment necessary to store and transport perishable goods, the perishable goods are wrapped or enclosed. Generically, the enclosure is referred to as a film, sealing film, stretch film, plastic film, or wrap. The film may be, for example, a synthetic or natural polymer.

Packaging perishable goods in preparation for transport and storage may involve stretching of the film and wrapping the film around the good or palletized goods. These techniques generally rely on film to film contact to create and maintain a seal. For example, the film may be stretched and wrapped on top of itself or on top of another piece of film. There may be adherence where there is film to film contact so that a separate adhesive may not be necessary. The film to film contact and adherence allows for the goods to be enclosed in a relatively quick, inexpensive, and simple manner, and enclosing the goods is not limited by the shape or size of the goods to be enclosed.

Films are primarily sold by the pound and the industry is very competitive, so thinner, lower cost films that are easier to manufacture are becoming more the standard, as evidenced by the industry's move away from dual-sided cling films. The trend to produce thinner gauge films that are cheaper and faster to produce has accelerated, and at the same time there is a trend to introduce numerous cast and multi-layer films that provide better product protection and containment during storage or transport but at a high cost per pound of plastic. There are many factors to consider such as environmental conditions during manufacturing, storage, transportation, and use of both lower and higher cost films making the right film choice for each application more challenging.

However, wrapping or encasing the goods with a film presents a challenge at lower temperatures because the films may exhibit diminished performance in the packaging environment compared to room temperature conditions. For example, films generally exhibit decreased ability to stretch and to adhere at the lower temperatures necessary to package, store, and transport food materials. When used in cold environments, typically there is dependence on only the thickness and formulation of the film to assure performance in a wide range of industrial applications. These challenges are also acute when creating a sealed enclosure in a cold environment by wrapping layers of stretch film around perishable products and injecting a modified atmosphere into the sealed enclosure. A modified atmosphere may include, for example, injection of gases such as nitrogen and carbon dioxide within the enclosure to deter deterioration, or maintaining a desired relative humidity level. In order to maintain a modified atmosphere, the stretch film must create a reliable, airtight enclosure. The various chemical formulations, compounds, and multilayer film combinations often fail or fall short when using them to capture or create a consistent, cost effective and reliably sealed enclosure. Because of the inherent differences in terms of product uses and a wide range of variables found in most manufactured stretch films there has been an increasing tradeoff between costs and desired performance.

A stretch film's ability to bind to itself to create a desired containment/enclosure around product(s) or a stack of goods is often difficult to achieve in some environmental applications such as freezers and cold rooms. It is even more difficult to manage these films when the goal is to create a gas tight sealed enclosure. To achieve a desired atmospheric level gas, humidity, and/or a specific environmental outcome, it is/has been necessary to either: (1) add more adhesive to the film formulation, (2) increase the thickness of the film, (3) increase the number of film layers, or (4) increase the amount of pre-stretch and the overall tension of the film. There are numerous reasons for poor results or inconsistency when using stretch films, and solving the problem to date has included the use of very tightly controlled film specifications and formulas with significant attention paid to cling characteristics that as previously described often vary in their effectiveness in frozen, cold, or industrial environments. The use of specialty films adds costs and often limits the ability to utilize multiple manufacturers to achieve a desired outcome. The use of thicker films and bags in conjunction with glues and/or filament tapes to solve the problem of creating a consistent product containment (and a sealed enclosure) also increases costs and reduces the recyclability of the packaging material as a whole.

Decreased performance of the film due to the environmental conditions in which they are applied may result in diminished load containment and unreliable sealed enclosures. Thus, overcoming these deficiencies may require increased costs, for example, using more film, the necessity to purchase a thicker or costlier film material, increase in time and labor required to package and seal the goods, and the increased cost due to spoilage from improper sealing.

Therefore, there is a need to improve the efficiency of wrapping and encasing goods with a sealing film, reduce film cost, improve the binding and sealing properties of various types of stretch films used to wrap and/or bag pallets at decreased temperatures, and increase the ability to recycle wrap materials.

SUMMARY

According to an embodiment, a method for controlling the temperature of a film before and/or during application is provided, the method comprising: warming the film from an ambient temperature to a temperature from about 2° C. to about 40° C. above the ambient temperature; stretching the film; and wrapping the film around a product; wherein the ambient temperature is below 15° C.

According to another embodiment, a system for controlling the temperature of a film before and/or during application, the system comprising: a heat source for heating a film; and stretch rollers; wherein the heat source heats the film from an ambient temperature to a temperature from about 2° to about 40° C. above the ambient temperature, wherein the film is heated prior to or simultaneous to being stretched by the stretch rollers, and wherein the ambient temperature is below 15° C.

BRIEF DESCRIPTION OF THE DRAWINGS

The features and advantages of the invention will be apparent from the following drawings wherein like reference numbers generally indicate identical, functionally similar, and/or structurally similar elements.

DETAILED DESCRIPTION

Figure 1:
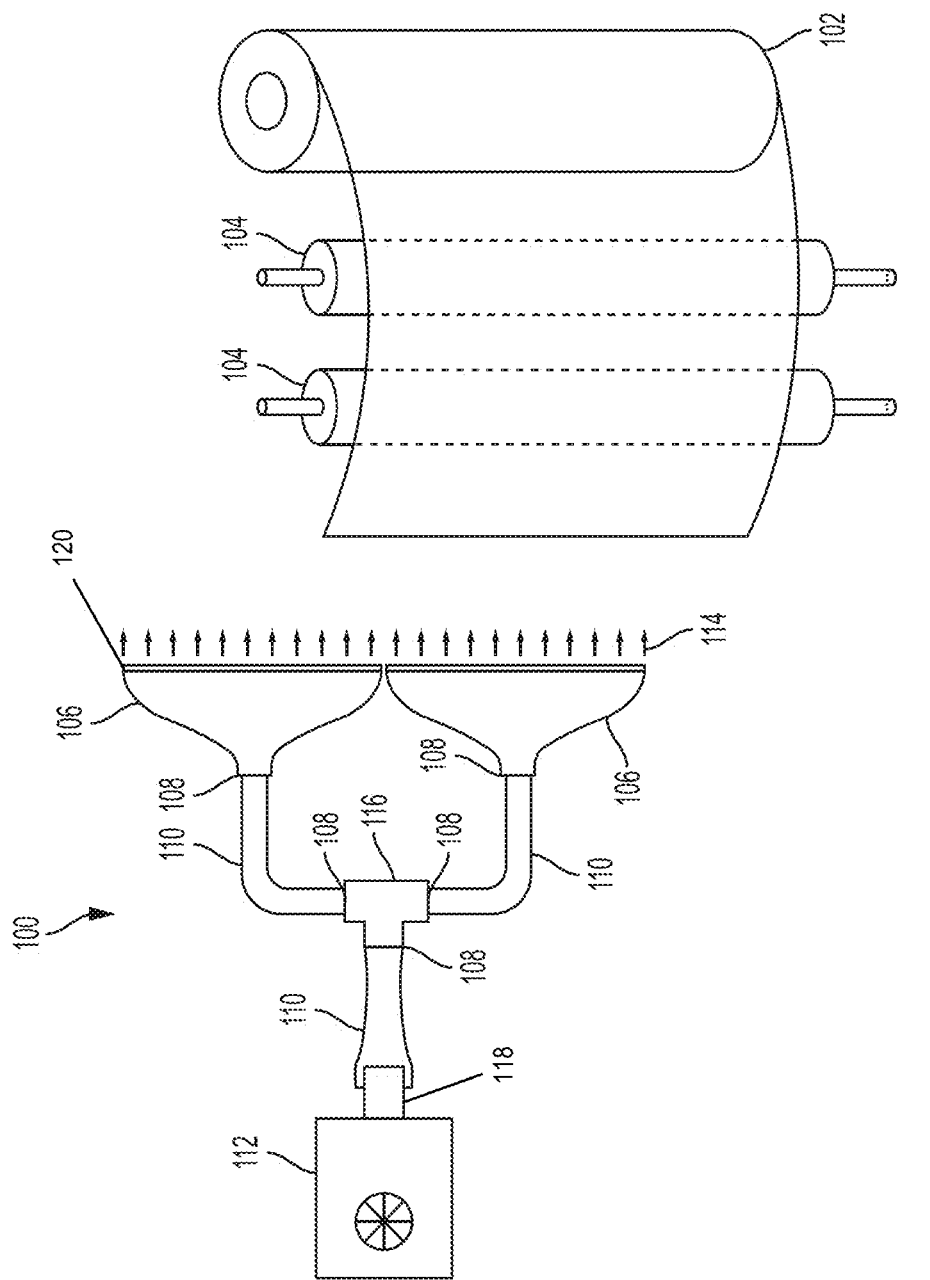
FIG. 1 is top view of a first embodiment of a system for preheating stretch film.

Embodiments of the invention are discussed in detail below. In describing embodiments, specific terminology is employed for the sake of clarity. A person skilled in the relevant art will recognize that other equivalent parts can be employed and other methods developed without departing from the spirit and scope of the invention.

Embodiments of the invention relate to warming stretch film material immediately before and/or as it is being applied to create a better and more consistent sealed enclosure. The warming of the stretch film material may occur as it is being prestretched and fed through the film application process, such as through or within the wrapper carriage head, or as part of the stretch-hooder as the bag is being formed, stretched, and pulled over the load on a pallet or stack of goods.

Film for preheating may be available on a roll and may be unrolled and wrapped around palletized goods. According to embodiments, the film may be stretched prior to wrapping by, for example, one or more stretch rollers that rotate in a direction away from the film roll. Preheating of the film roll may occur before, during, or after stretching of the film. According to an embodiment, the film may be a preformed bag. According to an embodiment, the film may be a sheet.

For example, according to an embodiment, as the large industrial size roll of film is loaded into the machine, it may be placed in an insulated/covered box thereby warming the film as it threads from the roll of uncut film to the bag forming portions of the machine where seaming, cutting, and stretching process occurs.

This warming of the stretch film is quite a different concept and process from that of a shrink wrap film where heat is applied only after the film is covering the goods. For example, according to embodiments of the invention, advantageously no high temperature heat is required, no flame, and no carbon monoxide in the work environment. The amount of heat required to "shrink wrap" a pallet would not be acceptable in a cold room or frozen storage environment. The embodiments of the present invention are additionally advantageous over other automated systems that use gas flame and blower systems to shrink the film after application. Such systems would not be acceptable in a closed temperature controlled cold room or freezer plant with heat and carbon monoxide issues.

According to embodiments, warming a film may be from an ambient temperature that is below optimum for that film such as, for example, <0 to 15° C. to a temperature that is above the ambient temperature, to an increase of about 2 to about 10° C. above the cold ambient temperature. According to embodiments, an ambient temperature may be, for example, from <0° to about 5° C., while a film's optimal operating temperature may be above 15° C. and below 40° C.

Film may be preheated using, for example, direct conduction of heat or thermal radiation. According to embodiments, a preheating system may be incorporated into a semi-automated or automated wrapping system. For example, the preheating system may be installed before, between, or after the stretch rollers. According to embodiments, the preheating system may be installed, for example, inside the carriage head.

According to embodiments, the targeted application of the heat to the film may be transferred directly via contact with the film or indirectly as with a warming of the carriage head, for example, by directed air flow. According to embodiments, the heat source may be placed inside the carriage head or insulated area holding the film, thereby the film wrapping and or bagging equipment would then operate with film that is warmer than ambient air.

According to embodiments, the film may be heated by direct contact with a heating element or heated air. According to embodiments, the film may be heated by thermal radiation from a heated element in proximity to the film. According to embodiments, the film may be heated by friction caused by contact between the film and a surface, for example, rollers warmer than ambient air. According to an embodiment, the film may be heated using dielectric heating using radio waves or microwaves or other methods that may provide energy targeted only on the film and not the environment or product being wrapped.

According to embodiments, a modified atmosphere may be injected into the enclosure during or after wrapping with film. The modified atmosphere may include, for example, injection of gases such as nitrogen and carbon dioxide within the enclosure to deter deterioration, or maintaining a desired relative humidity level. The modified atmosphere may be warmed to a temperature above the ambient temperature. According to embodiments, the modified atmosphere may be slightly warmed prior to or during injection in addition to warming of the film. According to embodiments, a heater may be placed in the gas line or in the nozzle for injecting a modified atmosphere into the packaged products. According to embodiments, the modified atmosphere may be heated about 2 to about 40 degrees above the ambient temperature. According to embodiments, the modified atmosphere may be heated to a temperature from about −5° C. to about 0° C. According to embodiments, the modified atmosphere and the film are warmed to about the same temperature. According to embodiments, when the modified atmosphere is warmed, it may not be necessary to preheat the stretch film during or prior to application because the slightly warmed modified atmosphere may allow the stretch film to create a reliable, airtight enclosure. According to embodiments, the warmed modified atmosphere may not negatively impact the core temperature of the product.

Referring generally to FIGS. 1-4, embodiments of a film preheating system are described. Referring now to FIG. 1, the film preheater 100 may generally comprise a heating unit 112, nozzles 106, and pre-stretch rollers 104 for stretching the film released from a film roll 102. According to an embodiment, the heating unit 112 may have an integrated blower device for expelling heated air 114. According to an embodiment, the heating unit 112 may have integrated temperature and air flow adjustable controls. In the embodiment illustrated in FIG. 1, for example, heated air 114 may exit heating unit 112 through outlet 118.

Tubing 110 may connect to outlet 118 to create a pathway for heated air 114 to flow from outlet 118. According to embodiments, multiple sections of tubing 110 may connect using fitting 108. According to embodiments, tubing 110 may connect to junction 116 using fitting 108, and junction 116 may be further connected to additional tubing 110. In this manner, junction 116 may split the heated air path into multiple pathways. According to an embodiment, junction 116 may be "T" shaped to split the heated air pathway into two discrete pathways. Junction 116 may be further connected to additional tubing 110 using fitting 108.

According to an embodiment, tubing 110 may be connected to each nozzle 106 using fitting 108. According to the embodiment of FIG. 1, heated air 114 exits heating unit 112 through outlet 118 and is directed through two different pathways each including junction 108, tubing 110, and nozzle 106. Each nozzle 106 may contain openings 120 that allow the heated air 114 to exit preheating system 100 and contact the film 102. According to an embodiment, each nozzle 106 may contain a slit opening. This would use a small amount of heat and more air flow to achieve the warming of the film.

According to embodiments, film preheater 100 may be incorporated into a semi-automated or automated wrapping system. For example, film preheater 100 may be installed before, between, or after the stretch rollers 104. According to embodiments, film preheater 100 may be installed, for example, inside the carriage head.

Heating unit 112 may be, for example, heat pads, blocks, wires, electric heat guns with fans, industrial-type air dryer, focused heat lamps of various types, infrared lamps, and targeted ultrasound. Tubing 110 may be formed from a variety of materials including plastics, such as high-density polyethylene, low-density polyethylene, or polypropylene, for example. Nozzle 106 may be made from a variety of materials including plastics or metals.

Figure 2:
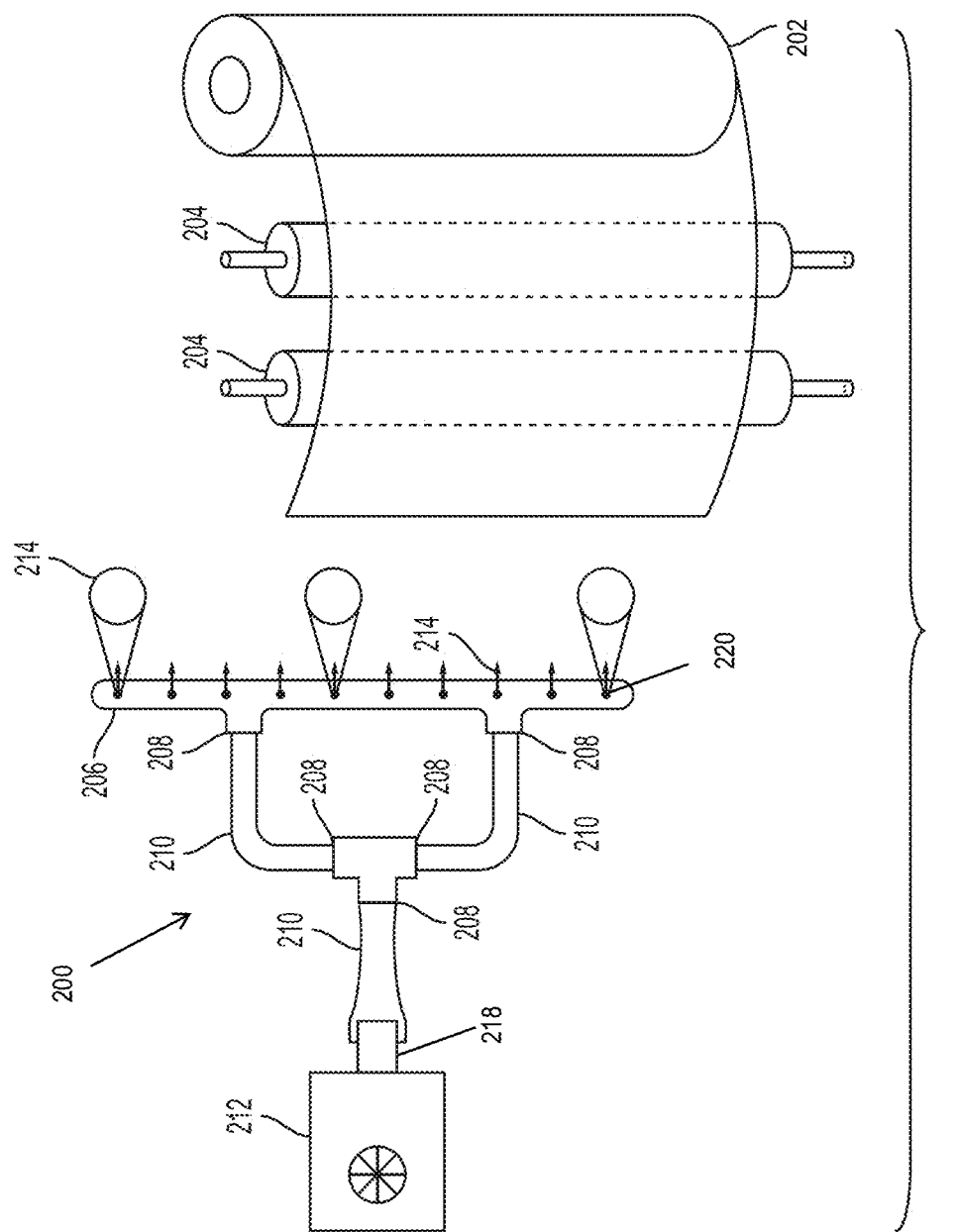
FIG. 2 is a top view of a second embodiment of a system for preheating stretch film.

The shape, size, number, and distribution of the openings 120 in nozzle 106 is not limited. For example, the shape, size, number, and distribution of openings may be selected based on the desired air flow, temperature increase of the film, and time of preheating the film. The embodiment of FIG. 2 is the same as FIG. 1, except as described herein. For example, according to the embodiment of FIG. 2, heated air 214 exits heating unit 212 through outlet 218 through junction 208, tubing 210, and a pipe 206 that is connected to both sections of tubing 210. Pipe 206 may contain a plurality of orifices 220 that allow the heated air 214 to exit preheating system 200 and contact the film. According to embodiments, preheating system 200 may be installed before, between, or after the stretch rollers 204. According to embodiments, the preheating system may be installed, for example, inside the carriage head.

Figure 3:
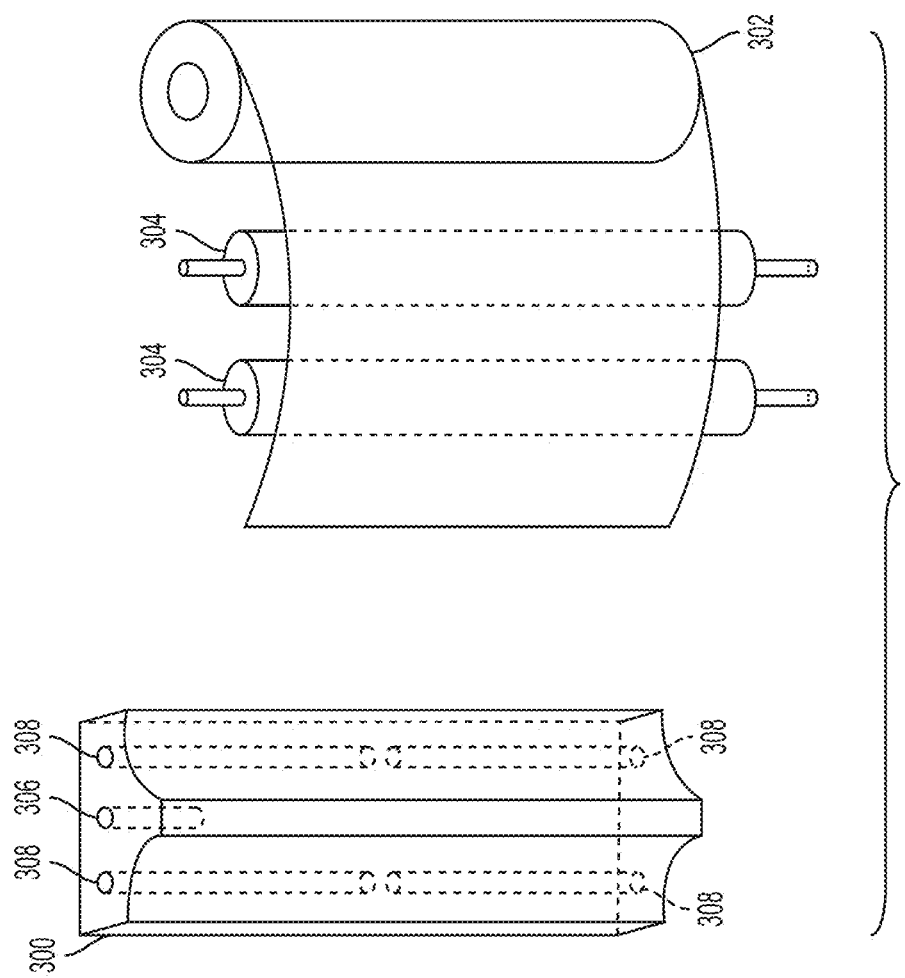
FIG. 3 is a top view of a third embodiment of a system for preheating stretch film.

According to the embodiment of FIG. 3, the heating unit may be comprised of a heating block 300. Heating block 300 may be formed from metal or metal alloy. According to embodiments, the heating block 300 is formed from a metal or metal alloy that reflects infrared radiation. According to an embodiment, the heating block 300 is formed from aluminum or an aluminum alloy.

According to embodiments, heating block 300 may house heating elements and thermostats and thermal sensors. For example, heating block 300 may contain slot 306 into which a thermostat is placed. The thermostat may be, for example, a heat sensor to control the amount of heat and in some cases air flow in order to keep heat and film temperature in an optimal range without using high or excess heat. Heating block 300 may contain slot 308 into which a heating element is placed. The heating element and thermostat may be electronically controlled to a specified temperature set point. According to embodiments, the heating element may provide for heat set points of from about −5° to about 40° C.

According to an embodiment, heating block 300 makes direct contact with the film and thereby heats the film by conduction. According to embodiments, heating block 300 does not make direct contact with the film and thereby heats the film by thermal radiation. According to embodiments, heating block 300 may be installed before, between, or after the stretch rollers 304. According to embodiments, heating block 300 may be installed, for example, inside the carriage head.

Figure 4:
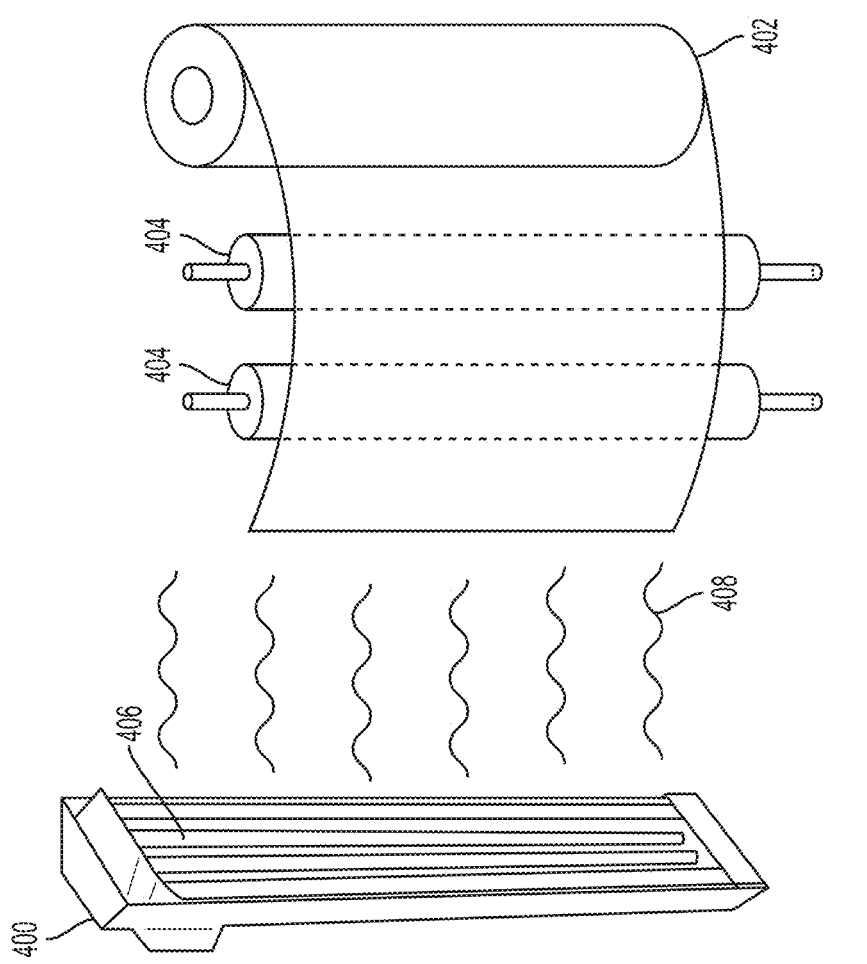
FIG. 4 is a top view of a fourth embodiment of a system to for preheating stretch film.

According to the embodiment of FIG. 4, the heating unit may be comprised of a lamp 400. Lamp 400 may be an infrared heat lamp containing infrared source 406. Infrared source may be located in proximity to film 402 thereby heating the film by radiating infrared radiation 408. According to embodiments, lamp 400 may be installed before, between, or after the stretch rollers 404. Lamp 400 may be installed, for example, inside the carriage head.

According to embodiments, the preheating system of the above disclosed embodiments may be used when the nature of the packaged good, for example, food products, necessitates that the packaging, palletization, and stacking occur at a temperature and/or humidity that may result in suboptimal performance of packaging film. According to embodiments, the preheating system may be used at temperatures below room temperature. According to embodiments, the preheating system may be used at temperatures below 16° C. According to embodiments, the preheating system may be used at about −5° to 30° C. According to embodiments, the preheating system may be used to heat the film up to a temperature of about 50° C.

According to embodiments, the film may be a synthetic or natural polymer. According to an embodiment, the film may be a plastic polymer. According to embodiments, the film is polyolefin, PVC, polyethylene, polypropylene, polyester, ethylene propylene, ethylene vinyl acetate, low density polyethylene, linear low density polyethylene and the like. According to embodiments, the film may be cellulose or polysaccharide polymer. According to embodiments, the film may contain a plurality of layers. According to embodiments, the film may be a coextrusion or laminate. According to embodiments, the film may contain chemical additives to impart specific properties, for example, lubrication, anti-static, anti-slip, anti-block, extrusion aids, tackifiers, cling agents, and pigments and the like.

According to embodiments, the amount of heat required may be varied in terms of amount and distribution within the film dispensing head, rollers, or carriage head to achieve the optimal film utilization as well as the optimal sealing bonds between films used in the creation of the sealed enclosures. According to embodiments, the heating elements may vary in size and shape and the heat may be continuous or provided in short bursts as necessary. According to embodiments, the film may be warmed about 0° to about 40° C. relative to the environmental temperature. According to embodiments, the film may be warmed to about 2° to about 30° C.

The relative warming of the film above the ambient air/film temperature as it is being applied and/or immediately before application may improve the stretch film utilization efficiency and enhance the ability of the stretch film to create a sealed enclosure. In contrast to shrink wrapping, embodiments of the invention do not adversely impact the ambient temperature or the temperature of the goods. In this manner, the ability of the film to securely contain products is improved while maintaining the necessary reduced temperature environment.

According to embodiments, the stretch film warming process may be further enhanced by adding an electrostatic charge or alternating charge to one or more layers of film and/or activating charged particles within the film itself to make film to film bonding more effective. According to embodiments, the type of film, for example, blown layer or cast; the thickness or gauge of the film; and film formulation may be selected to further improve the efficiency, consistency, and quality of film being applied.

It is foreseen that the aspects and features of the various embodiments described herein may be used in combination with each other.

The film preheating systems 100, 200, 300, and 400 of the described embodiments may be used to preheat film for enhanced film performance while packaging and wrapping at decreased temperatures. Advantageously, the film preheaters of the described embodiments provide a simple and cost-effective method for creating a better sealed enclosure using stretch films. The described embodiments warm the film enough to enhance the binding of layers of the film to improve the ability of the film to securely contain products, to create a better sealed enclosure that further secures the enclosure from leaking or losing the desired product protection during processing, storage, or transport. Further, the described embodiments do not negatively impact the controlled temperature of the goods, which would otherwise promote product damage or spoilage. Additionally, the increased effectiveness of the film in creating sealed enclosures may obviate the need for tape or adhesives, increasing the recyclability of the packaging material.

While various exemplary embodiments have been described above, it should be understood that they have been presented by way of example only, and not limitation. Thus, the breadth and scope of the present disclosure should not be limited by any of the above-described exemplary embodiments.

I claim:

1. A system for controlling the temperature of a film before and/or during application, the system comprising: a heat source for heating a film, said heat source configured to provide a targeted application of heat directly to the film, wherein the heat source is positioned so as to provide heat directly to a surface of the film and across a width of the film on at least one roller, and wherein the heat source heats the film from an ambient temperature to a temperature from about 2° C. to about 40° C. above the ambient temperature, wherein the film is heated prior to or simultaneous to being stretched, and wherein the ambient temperature is below 15° C.

2. The system of claim 1, wherein the heat source is located inside of a carriage head.

3. The system of claim 1, wherein the heat source comprises an infrared lamp.

4. The system of claim 1, wherein the heat source comprises a metal heat block.

5. The system of claim 1, wherein the heat source comprises heated air.

6. The system of claim 1, wherein the film is comprised of polyolefin, PVC, polyethylene, polypropylene, polyester, ethylene propylene, ethylene vinyl acetate, low density polyethylene, linear low density polyethylene or a combination thereof.

7. The system of claim 1, wherein the film is comprised of linear low density polyethylene.

8. The system of claim 1, wherein the ambient temperature is from about 0° to about 15° C.

* * * * *